United States Patent
Filla et al.

(10) Patent No.: US 9,308,936 B2
(45) Date of Patent: Apr. 12, 2016

(54) METHOD FOR CONTROLLING A WORKING MACHINE, AND A WORKING MACHINE

(75) Inventors: Reno Filla, Eskilstuna (SE); Joakim Unneback, Eskilstuna (SE); Bobbie Frank, Eskilstuna (SE); Andreas Nordstrand, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/115,883

(22) PCT Filed: May 6, 2011

(86) PCT No.: PCT/SE2011/000080
§ 371 (c)(1),
(2), (4) Date: Nov. 7, 2013

(87) PCT Pub. No.: WO2012/154087
PCT Pub. Date: Nov. 15, 2012

(65) Prior Publication Data
US 2014/0145415 A1   May 29, 2014

(51) Int. Cl.
*B62D 6/00* (2006.01)
*B62D 12/00* (2006.01)
(Continued)

(52) U.S. Cl.
CPC ............... *B62D 6/00* (2013.01); *B60W 10/20* (2013.01); *B60W 30/18145* (2013.01);
(Continued)

(58) Field of Classification Search
CPC ........................................................ B62D 6/00
USPC .............................. 180/22; 280/446.1; 701/42
See application file for complete search history.

(56) References Cited

U.S. PATENT DOCUMENTS 5,607,028 A     3/1997  Braun et al.
6,129,170 A *  10/2000  Hickman et al. .............. 180/418
(Continued)

FOREIGN PATENT DOCUMENTS

DE   20023471 U1   6/2004
EP    0001669 A1   5/1979
(Continued)

OTHER PUBLICATIONS

International Search Report (Jan. 16, 2012) from corresponding International Application PCT/SE2011/000080.
(Continued)

*Primary Examiner* — Joseph Rocca
*Assistant Examiner* — Felicia L Brittman
(74) *Attorney, Agent, or Firm* — WRB-IP LLP

(57) ABSTRACT

A method is provided for controlling a working machine that includes a front section having a frame and a pair of wheels arranged on a geometrical front wheel axis, and a rear section having a frame and a pair of wheels arranged on a first geometrical rear wheel axis and a pair of wheels arranged on a second geometrical rear wheel axis arranged behind the first rear wheel axis. The front section and the rear section are pivotally connected to each other for pivoting about a substantially vertical pivot axis. In a first control mode the wheels of the second geometrical rear wheel axis are steered to substantially follow the same tracks as the wheels of the geometrical front wheel axis when driving the working machine during cornering, and in a second control mode steering the wheels of the second geometrical rear wheel axis follow tracks which are different from the tracks of the wheels of the geometrical front wheel axis.

23 Claims, 5 Drawing Sheets

(51) Int. Cl.
    *B60W 10/20*    (2006.01)
    *B60W 30/18*    (2012.01)

(52) U.S. Cl.
    CPC ........ *B60W 30/18172* (2013.01); *B62D 12/00* (2013.01); *B60W 2300/50* (2013.01); *B60W 2520/26* (2013.01); *B60W 2720/22* (2013.01)

(56) References Cited

U.S. PATENT DOCUMENTS

| | | | |
|---|---|---|---|
| 6,299,181 | B1 | 10/2001 | Ericksson |
| 7,798,262 | B2 | 9/2010 | Lundstroem |
| 2002/0027025 | A1 | 3/2002 | Kobayashi et al. |
| 2005/0236896 | A1 | 10/2005 | Offerle et al. |
| 2008/0041655 | A1 | 2/2008 | Breiner et al. |
| 2010/0307843 | A1* | 12/2010 | Lawson, Jr. .................. 180/6.48 |

FOREIGN PATENT DOCUMENTS

| | | |
|---|---|---|
| EP | 0781699 A1 | 7/1997 |
| EP | 1081021 A2 | 3/2001 |
| GB | 1132930 A | 11/1968 |
| SU | 734049 A1 | 5/1980 |
| WO | 9109765 A1 | 7/1991 |
| WO | 9910221 A1 | 3/1994 |
| WO | 0236412 A | 5/2002 |
| WO | 2005047042 A1 | 5/2005 |
| WO | 2010136072 A1 | 12/2010 |
| WO | 2011049509 A1 | 4/2011 |

OTHER PUBLICATIONS

International Preliminary Report on Patentability (Apr. 22, 2013) from corresponding International Application PCT/SE2011/000080.
European Search Report (Dec. 1, 2014) for corresponding European App. 11 86 5216.

* cited by examiner

METHOD FOR CONTROLLING A WORKING MACHINE, AND A WORKING MACHINE

BACKGROUND AND SUMMARY

The invention relates to a method for controlling a working machine. References to "the invention" herein should be understood to be references to one or more aspects of the invention.

The invention is applicable on working machines within the fields of industrial construction machines, in particular load receivers such as articulated haulers or dumpers. Although the invention will be described hereinafter with respect to an articulated hauler, the invention is not restricted to this particular machine, but may also be used in other heavy working machines or construction equipment.

In connection with transportation of heavy loads, a working machine in the form of an articulated hauler is frequently used. Such working machines may be operated with large and heavy loads in areas where there are no roads, for example for transports in connection with road or tunnel building, sand pits, mines, forestry and similar environments. Thus, an articulated hauler is frequently used in rough terrain and on a slippery ground where no regular roads are present.

An articulated hauler is a frame-steered working machine having a container for receiving and transportation of a load. Such a working machine comprises a front section with a front frame and a first set of wheels, and a rear section with a rear frame and a second set of wheels. A pivot joint is arranged between the front section and the rear section allowing the front section and the rear section to pivot relative to each other about an axis extending in the vertical direction. Furthermore, the working machine comprises means for steering the working machine by pivoting the front section and the rear section relative to each other about the vertical pivot axis. The steering means normally includes a pair of hydraulic cylinders.

The front section is a tractor for driving the working machine and the rear section is provided with the container for receiving the load. In order to optimize the load capacity, the front section is normally shorter than the rear section. Usually the front section has one wheel axle, whereas the rear section has two wheel axles mounted as bogie axles. This in turn means that the pivot point is arranged asymmetrically, i.e. the distance from the wheel axle of the front section to the pivot point is shorter than the distance from the pivot point to the wheel axle/axles of the rear section. Thus, the wheels will follow different turning radii during cornering. The front wheel axle will follow a first turning radius and the bogie axles will follow a second radius, where the first radius is larger than the second radius.

In other words, during cornering the wheels of the front axle have to rotate faster than the wheels of the rear axles, and further the outer wheels have to rotate faster than the inner wheels. These geometrically required differences in rotation speed will give rise to slip between the wheels and the ground and/or constrained torque in the drive line of the working machine. In order to compensate for different rotation speeds some kind of mechanical differential can be used which allows the outer wheels to have higher rotation speed than the inner wheels.

It is desirable to provide a method and a working machine defined by way of introduction, by which method and working machine the fuel consumption can be reduced at the same time as the terrainability can be improved.

The invention, according to an aspect thereof, is based on a first insight that since the wheels of the rear section of an asymmetrical frame-steered working machine will travel in different tracks during cornering as compared to the wheels of the front wheel axle, also the wheels of the rear axles are travelling, on fresh ground not deformed and compacted by the wheels of the front wheel axle.

This in turn implies an increased rolling resistance for the wheels of the rear axles during cornering as compared to driving the working machine straight forward where the wheels of the rear axles are following the tracks of the wheels of the front wheel axle.

In accordance with an aspect of the invention, in the first control mode the rolling resistance can be reduced by controlling wheels of the rear section of the working machine to follow the tracks of the wheels of the front section. This in turn will reduce the fuel consumption due to the use of already deformed and compacted ground.

The invention, according to an aspect thereof, is further based on a second insight that if the traction for one or more wheels of the rear section and the ground is not sufficient when the front and rear wheels are following the same tracks, for many operation and ground conditions the terrainability can be improved by controlling wheels of the rear section to follow tracks which are different from the tracks of the wheels of the front section.

In accordance with an aspect of the invention, in the second mode the traction can be increased by driving wheels of the rear section on fresh ground.

Thus, an aspect of the invention enables a greater flexibility and an optimized driving of the working machine where the fuel consumption can be reduced and the terrainability can be improved when required.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
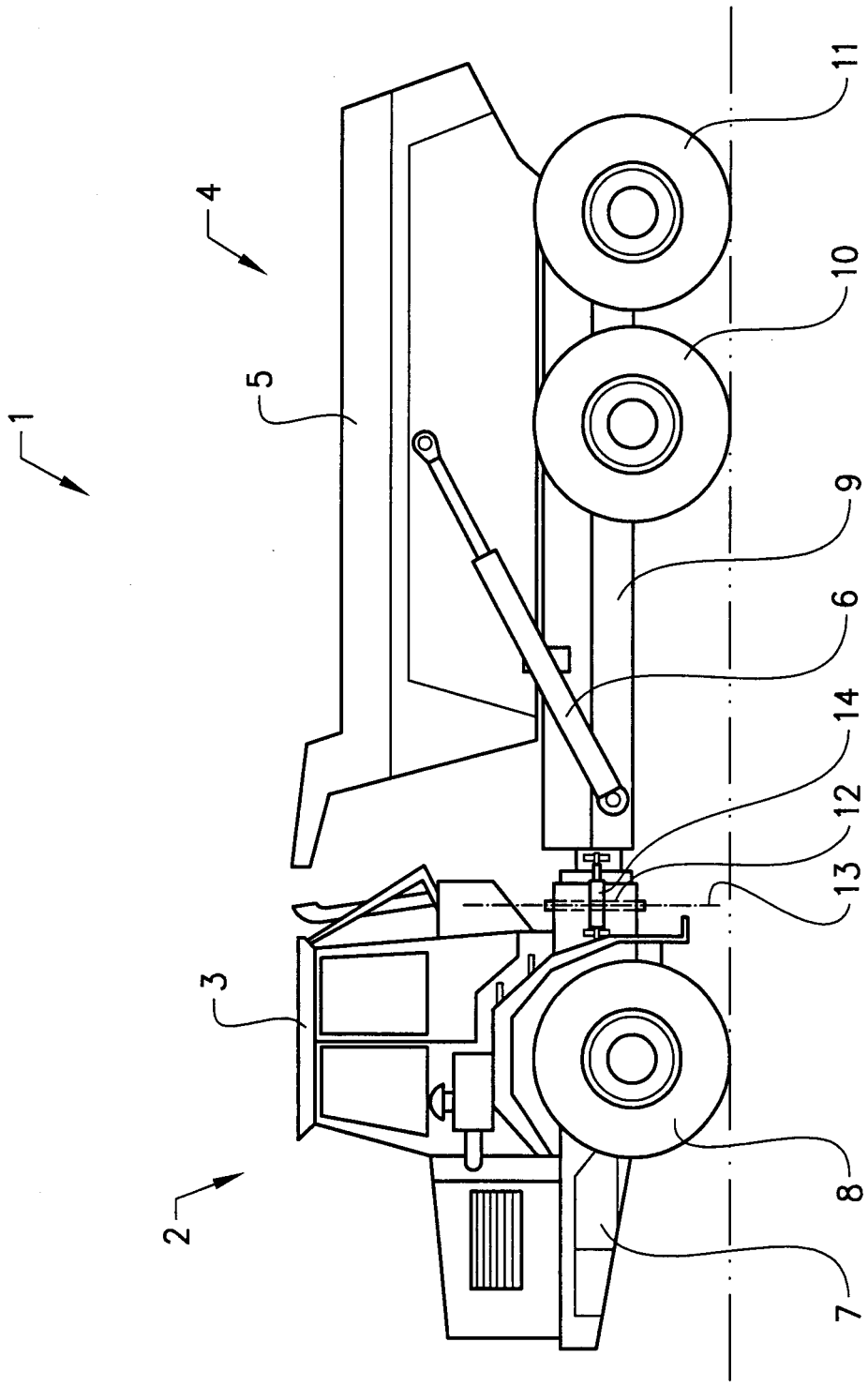
FIG. 1 is a lateral view illustrating a frame-steered articulated hauler.

FIG. 1 is an illustration of a working machine 1 in the form of an articulated hauler having a front section 2 with a cab 3 for a driver and a rear section 4 with a container 5 for receiving a load. The container is preferably pivotally connected to the rear section and tiltable by means of a pair of tilting cylinders 6, for example hydraulic cylinders. The front section has a front frame 7 and a pair of wheels 8 suspended from the front frame 7. The rear section 4 has a rear frame 9 and two pair of wheels 10, 11 suspended from the rear frame 9.

The working machine is frame-steered, i.e. there is a pivot joint 12 connecting the front section 2 and the rear section 4 of the working machine 1. The front section and the rear section are pivotally connected to each other for pivoting about a substantially vertical pivot axis 13.

The working machine preferably comprises a hydraulic system having two hydraulic cylinders 14, steering cylinders, arranged on opposite sides of the working machine for turning the working machine by means of relative movement of the front section 2 and the rear section 4. The hydraulic cylinders can, however, be replaced by any other linear actuator for steering the machine, such as an electromechanical linear actuator.

The working machine can further comprise a second pivot joint connecting the front section and the rear section of the working machine for allowing the front section and the rear section to pivot relative to each other about a substantially horizontal pivot axis extending in the longitudinal direction of the working machine.

Figure 2:
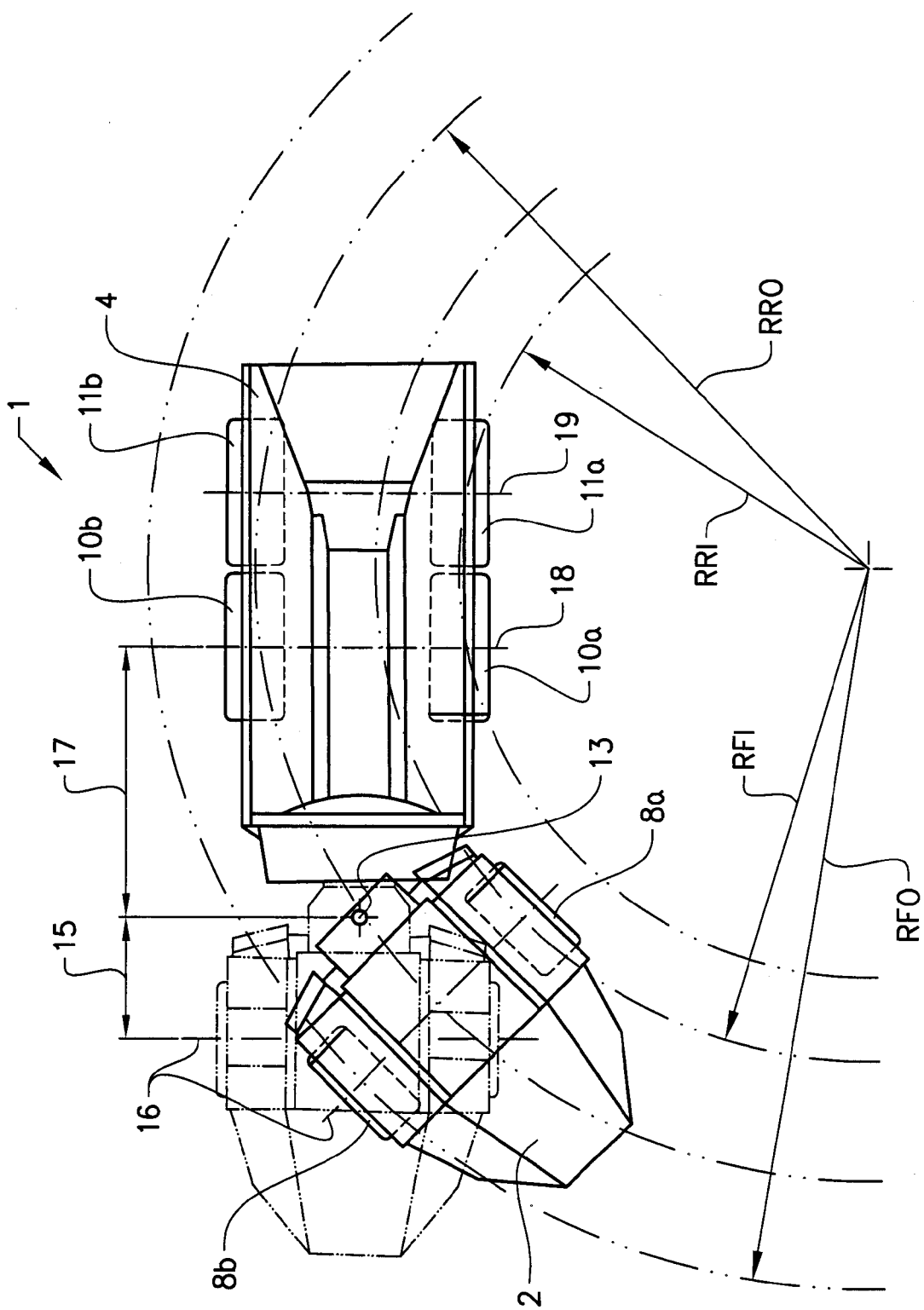
FIG. 2 is a view from above of the frame-steered articulated hauler illustrated in FIG. 1.

FIG. 2 shows the frame-steered articulated hauler 1 in a view from above during cornering. The front section 2 is pivoted relative to the rear section 4, and since the distance 15 from the geometrical front wheel axis 16 to the pivot point 13 is shorter than the distance 17 from the pivot point to the geometrical rear wheel axes 18, 19, the wheels will follow different turning radii during cornering. The front wheel 8a on the left side of the working machine moves along a larger radius RFI than the radius RRI for the rear wheels 10a, 11a of the left side of the working machine, and correspondingly for the right side of the working machine (radii RFO and RRO). The outer wheel 8b of the front section 2 moves along a larger radius RFO than the radius RFI for the inner wheel 8b of the front section 2, and correspondingly for the wheels of the rear section of the working machine (RRO and RRI).

The wording that a pair of wheels is arranged on a "geometrical wheel axis" used herein is intended to indicate that the wheels are substantially coaxially aligned in the design position, or in other words; a wheel on the left side and a wheel on the right side of the working machine have the same centre axis. The expression "geometrical wheel axis" is used herein to indicate the position of the current pair of wheels, but should not be interpreted as the wheels being mechanically arranged on one and the same physical wheel axle. A pair of wheels arranged on a geometrical wheel axis can be individually suspended from the frame of the working machine or be mounted to one and the same wheel axle which in turn is suspended from the frame of the working machine.

Figure 3:
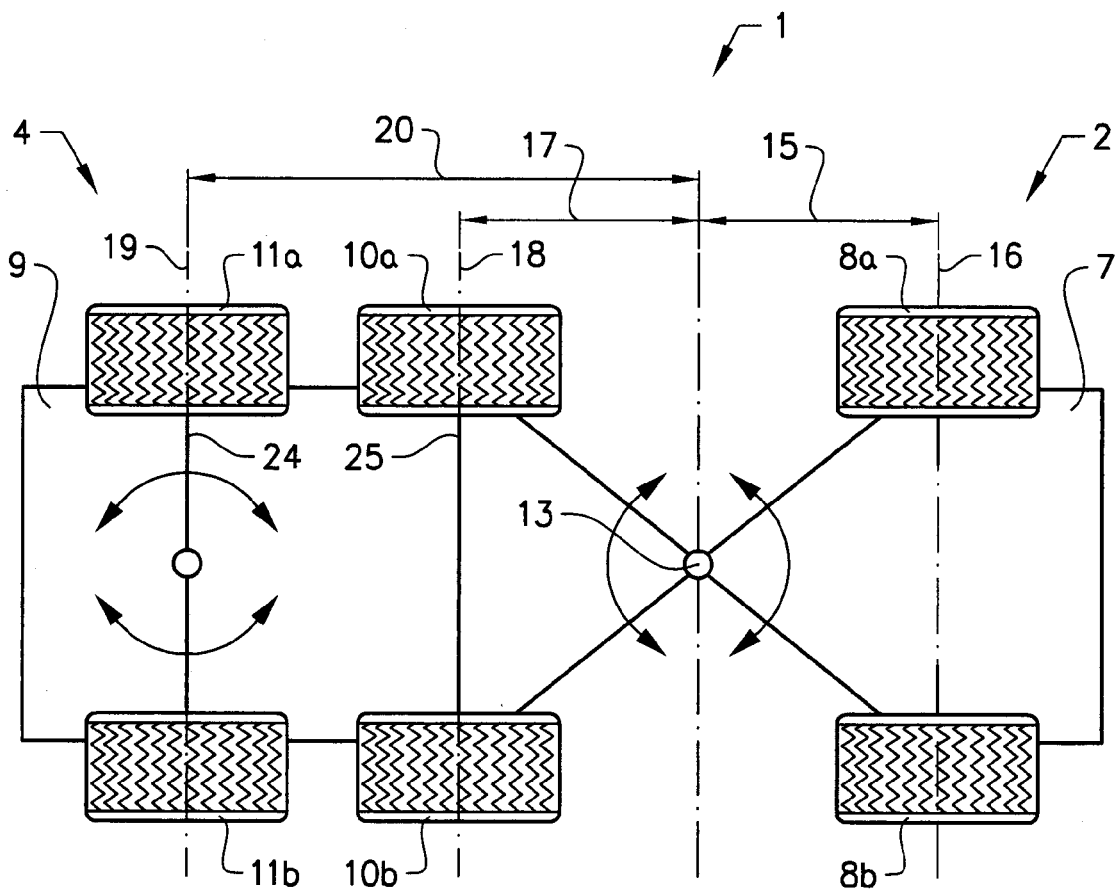
FIG. 3 is a schematic illustration of a driveline concept of a working machine according to the invention.

FIG. 3 shows in a schematic view from above a first driveline concept of the working machine according to an aspect of the invention. The front section 2 has a front frame 7 and a pair of wheels 8a, 8b arranged on a geometrical front wheel axis 16. The rear section 4 has a rear frame 9 and a pair of wheels 10a, 10b arranged on a first geometrical rear wheel axis 18 and a pair of wheels 11a, 11b arranged on a second geometrical rear wheel axis 19. The second rear wheel axis 19 is arranged behind the first rear wheel axis 18 (with respect to the normal straight forward driving direction). The front section 2 and the rear section 4 are pivotally connected to each other for pivoting about a substantially vertical pivot axis 13 (in FIG. 3 illustrated as a point). The distance 15 from the front wheel axis 16 to the vertical pivot axis 13 is shorter than the distance 20 from the vertical pivot axis 11 to the second rear wheel axis 19.

Figure 3B:
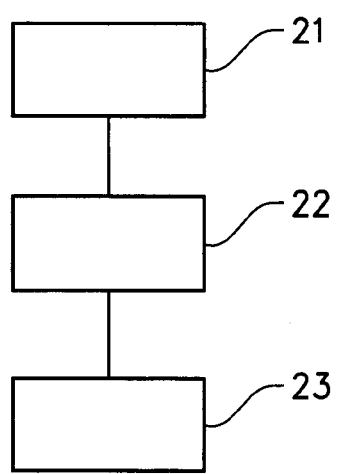
FIG. 3b is a schematic picture of a mode selector function.

As schematically illustrated in FIG. 3b, the working machine comprises a means 21 for determining an operation parameter value indicative of the traction between a driven wheel of the rear section and the ground. The choice of operation parameter value determination means 21 is dependent on the parameter to be measured and/or calculated. For a lot of parameters some kind of sensor is preferably used. For example, if the parameter is wheel slip, one or more sensors for measuring the wheel rotation speed can be used to determine any deviation in the speed of rotation for different wheels and/or any unexpected discrepancy between the rotation speed of the wheels a id the current velocity of the working machine. A further example is a sensor arranged for measuring the normal force or wheel load pressure in the contact point between a wheel and the ground.

One or more parameters which are enable to indicate a value related to the traction can be used. The relevant parameters can be divided into two main groups. A first main group is constituted by parameters which indicate traction problem in the future, such as the current position and travelling direction of the working machine together with prior/derived knowledge of the surrounding environment, the inclination of the ground, the normal force per wheel, micro slip between the wheel and the ground. A second main group is constituted by parameters which indicate present traction problem, such as wheel slip, the operator using a kick-down function to compensate for expected future traction problems, irregular movement of the working machine. One or more parameters can be selected from the first group and/or the second group.

The working machine further comprises a mode selection function 22 that enables selection between a first control mode and a second control mode based on the determined parameter value. This mode selection function can be integrated in a control unit of the working machine. In one embodiment of an aspect of the invention the mode selection function 22 will be adapted to indicate to the operator of the working machine that one control mode is preferable to another control mode, and indicate for example that a change from the first control mode to the second control mode should be performed. As an example, information on a display 23, a sound, etc., can be used to inform the operator. Thereafter the operator can manually activate the desired control mode, for example by a control lever on the switch panel. The control unit can be provided with a program having code means for performing the method according to an aspect of the invention when said program is run on a computer.

In a further embodiment of the invention the mode selection function will be adapted to automatically select and/or change control mode without the need of any action from the operator. Such a function is however preferably limited to certain conditions in order to secure safety. The function is preferably designed so that the operator can choose to overrule the automatically mode selection made by the control unit.

In the first control mode the wheels of the second rear wheel axis are steered to substantially follow the same tracks as the wheels of the front wheel axis when driving the working machine during cornering. Thereby the rolling resistance for the wheels of the second rear wheel axis can be reduced. In the second control mode the wheels of the second rear wheel axis are steered to follow tracks which are different from the tracks of the wheels of the front wheel axis when driving the working machine during cornering. Thereby the traction from the wheels of the second rear wheel axis can be increased.

The first control mode can be used as a default mode and switching from this mode to the second control mode is then performed when an insufficient traction between a driven wheel of the rear section and the ground has been determined.

In the embodiment illustrated in FIG. 3, the working machine has a pivotable supporting unit 24 suspended from the frame 9 of the rear section 4. The wheels 11a, 11b of the second rear wheel axis are mounted to the supporting unit whereby the wheels are pivotable by pivoting the supporting unit. The supporting unit 24 can be for example a wheel axle which mechanically connects the left wheel and the right wheel of the current wheel pair. Thus, by pivoting the supporting unit relative to the rear frame both wheels are pivoted. In order to follow the tracks of the wheels of the front section, the supporting unit is to be pivoted in the opposite direction compared to the front section, i.e. when the front section is pivoted clockwise relative to rear section (the working machine is turning to the right), the supporting unit is pivoted anti-clockwise relative to the frame of the rear section.

In the embodiment illustrated in FIG. 3, the distance 15 from the front wheel axis 16 to the vertical pivot axis 13 is substantially the same as the distance 17 from the vertical pivot axis 13 to the first rear wheel axis 18. This means that the wheels of the first rear axis will substantially follow the tracks of the wheels of the from wheel axis without steering the wheels which thereby can be non-steerable. The first rear wheel axis 18 can be a fixed (non-pivotable) wheel axle 25 suspended from the rear frame to which wheel axle the wheels 10a, 10b are mounted. The wheels 8a, 8b of the front wheel axis 16 can be non-steerable wheels since the working machine is frame-steered, and preferably the wheels are individually suspended from the front frame 7 of the front section 2.

In the description hereinafter, with reference to FIGS. 4-6, only features not disclosed herein before and differences compared to previously described embodiments will be described. As it regards features and functions in common which are already described and/or illustrated reference is made to previously described embodiments and figures. Furthermore, same reference numerals have been used for similar components comprised in more than one embodiment.

Figure 4:
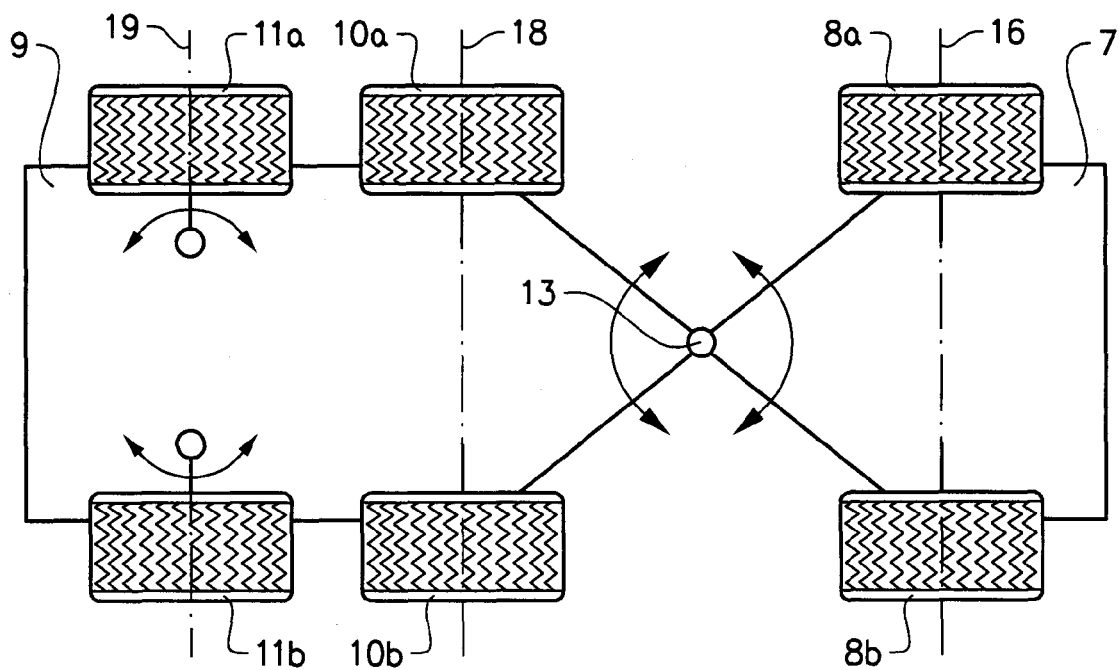
FIG. 4 is a schematic illustration of a further embodiment of a driveline concept of a working machine according to the invention.

In the embodiment illustrated in FIG. 4, the wheels 11a, 11b of the second rear wheel axis 19 are individually suspended from the frame 9 of rear section. The wheels are pivotable relative to the frame 9 of the rear section. The wheels 11a, 11b of the second rear wheel axis 19 are preferably individually pivotable to allow the wheels to be pivoted to different angles. In an alternative embodiment the wheels are forced to pivot to the same degree. This can be achieved by some kind of bar connecting the wheels, though the wheels are individually suspended from the frame. The wheels 10a, 10b of the first rear wheel axis 18 are individually suspended and preferably non-steerable since the distance from the front wheel axis 16 to the vertical pivot axis 13 is substantially the same as the distance from the vertical pivot axis 13 to the first rear wheel axis 18.

Figure 5:
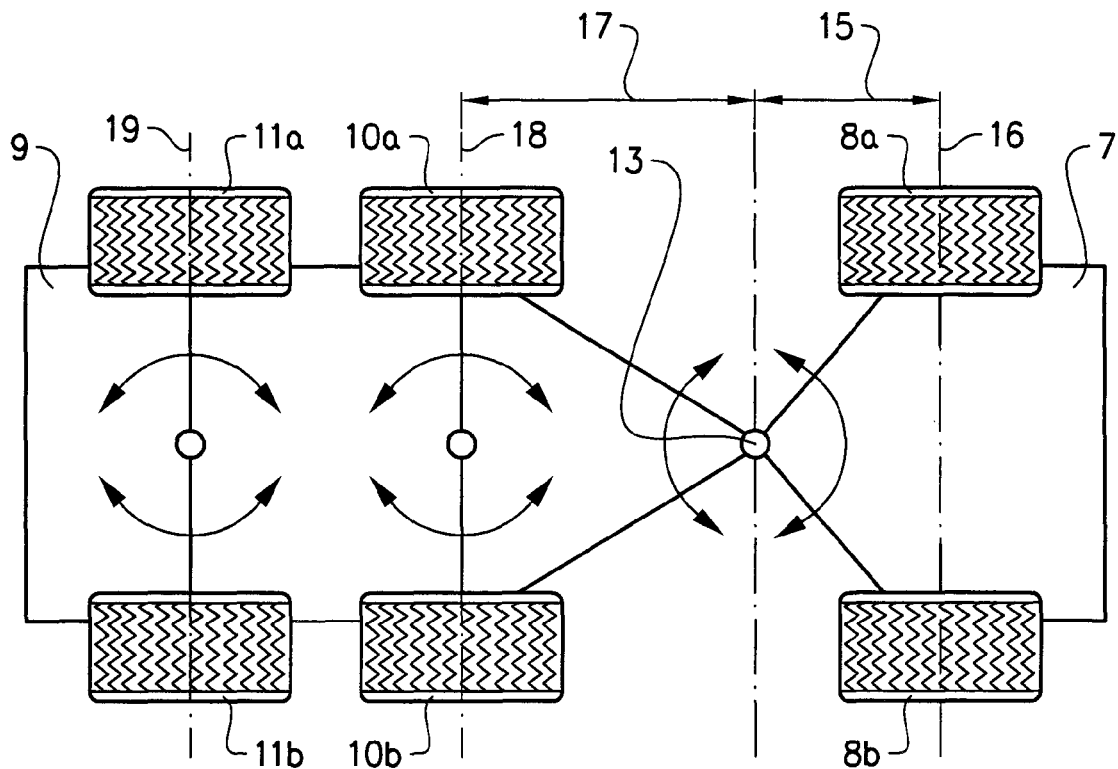
FIG. 5 is a schematic illustration of a further embodiment of a driveline concept of a working machine according to the invention.

In the embodiment illustrated in FIG. 5, the wheels 10a, 10b; 11a, 11b of both the first rear wheel axis 18 and the second tear wheel axis 19 are suspended and pivotable in the same way as already described for the wheels of the second rear axis in the embodiment illustrated in FIG. 3. In the embodiment illustrated in FIG. 5 the first rear wheel axis 18 is arranged asymmetrically relative to the vertical pivot axis 13, i.e. the distance from the front wheel axis 16 to the vertical pivot axis 13 is shorter than the distance 17 from the vertical pivot axis 13 to the first rear wheel axis 18. In the first control mode, the wheels 10a, 10b of the first rear wheel axis 18 are steered to substantially follow the same tracks as the wheels 8a, 8b of the front wheel axis 16 when driving the working machine during cornering. Thereby the rolling resistance for the wheels 10a, 10b of the first rear wheel axis 18 can be reduced. In the second control mode, the wheels 10a, 10b of the first rear wheel axis 18 are steered to substantially follow the same tracks as the wheels 11a, 11b of the second rear wheel axis 19 during cornering. Thereby the traction from the wheels of the first rear wheel axis 18 can be increased.

Figure 6:
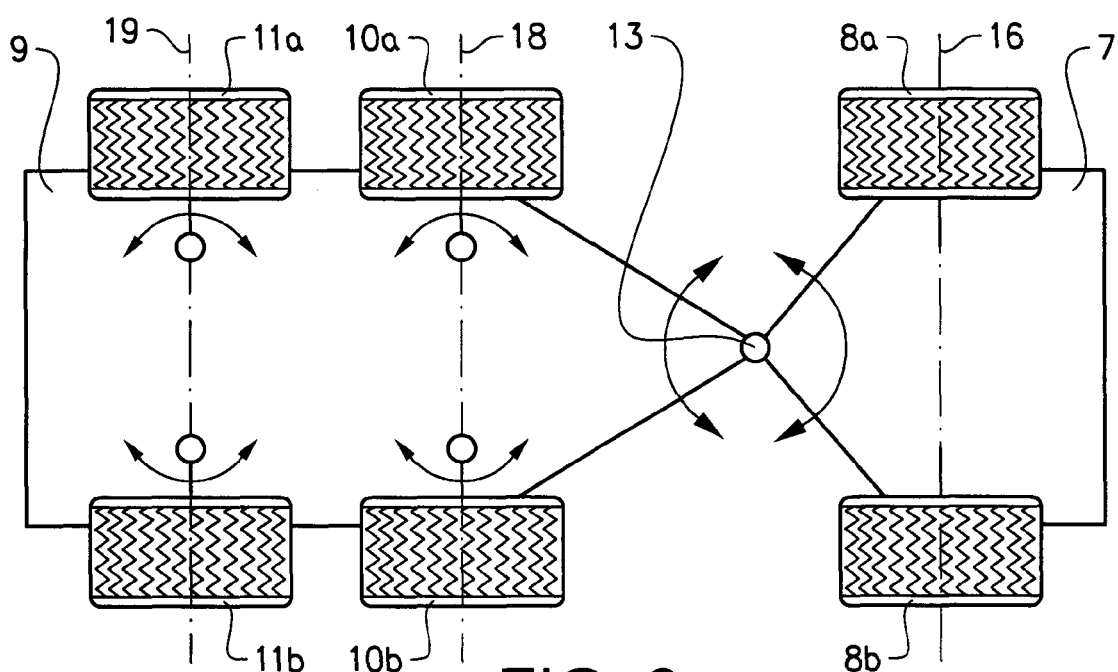
FIG. 6 is a schematic illustration of a further embodiment of a driveline concept of a working machine according to the invention.

In the embodiment illustrated in FIG. 6, the wheels of both the first rear wheel axis 18 and the second rear wheel axis 19 are suspended and pivotable in the same way as already described for the wheels of the second rear axis in the embodiment illustrated in FIG. 4. The first rear wheel axis 18 is arranged asymmetrically as already described for the embodiment illustrate in FIG. 5, and the wheels 10a, 10b of the first rear axis 18 are steered in the first and second control modes in the way as also already described for the embodiment illustrated in FIG. 5.

The wording that one or more wheels are "suspended from the frame" used herein is intended to indicate that the wheels are mechanically connected to the frame. Such a suspended wheel is preferably arranged in a way allowing the wheel to move somewhat in the vertical direction relative to the frame during influence of a damping means.

Individually suspended wheels are advantageous. In contrast to prior art articulated haulers, where the load is taken by the vehicle body frame and the wheel axles which makes a design counteracting bending and torsion stresses necessary and in turn results in an increased weight of the working machine and increased fuel consumption, the working machine according to the invention can be designed such that the load is supported directly above the individually suspended wheels. This will make lightweight frame designs possible and the fuel consumption will be reduced due to decreased total mass of the working machine.

Furthermore, by individually suspended wheels it is possible to optimize the ground pressure and thereby increase traction and improve the terrainability. Within certain limitations the mass of the working machine can be distributed to the wheels in a way adapted to the current conditions. This will influence the normal force per wheel, which in turn influences the traction.

In the case wheels are mounted to a supporting unit and the supporting unit is suspended from the frame, the supporting unit can be arranged correspondingly, allowing the supporting unit to move somewhat in the vertical direction during influence of damping means.

The number of driven wheels and the combinations of wheels that are driven can be varied within the scope of the invention. Preferably, all wheels of all wheel axes of the working machine are driven. Although driven wheels are preferably used, for the embodiments described with reference to FIGS. 3-4 the wheels of the first rear wheel axis could be non-driven wheels or driven wheels. The wheels of the second rear wheel axis are preferably driven in all embodiments illustrated in FIGS. 3-6 to enable an increased traction when travelling on fresh ground. However, if the wheels of the first rear wheel axis are driven in the embodiments illustrated in FIGS. 5-6, the wheels of the second rear wheel axis could be non-driven wheels. The wheels of the front wheel axis are preferably driven wheels.

In all embodiments described herein the driven wheels can be arranged on driven hub units, where each wheel/hub unit has its own driving motor, for example an electric motor or a hydraulic motor. Thereby the torque and/or the rotational speed of each wheel can be controlled individually in order to minimize losses and wear. By controlling the speed/torque of individual wheels the terrainability can be improved.

During cornering the inner wheels (i.e. the wheels on the inner side of a turn/curve) can be controlled to have a lower rotational speed, whereas the outer wheels (i.e. the wheels on the outer side of a turn/curve) can be controlled to have higher rotational speed, compared to the speed of the wheels when travelling straight ahead. In addition, in case the wheels on one and the same side of the machine do not follow the same track, i.e. the wheels travelling different distances, the rotational speed of each wheel can be controlled to compensate for the different distances.

It is to be understood that the present invention is not limited to the embodiments described above and illustrated in the drawings; rather, the skilled person will recognize that many changes and modifications may be made within the scope of the appended claims.

The invention claimed is:

1. A method for controlling a working machine, the working machine comprising a front section having a frame and a pair of wheels arranged on a geometrical front wheel axis, and a rear section having a frame and a pair of wheels arranged on a first geometrical rear wheel axis and a pair of wheels arranged on a second geometrical rear wheel axis arranged behind the first geometrical rear wheel axis, the front section and the rear section being pivotally connected to each other for pivoting about a substantially vertical pivot axis, the distance from the geometrical front wheel axis to the vertical pivot axis being shorter than the distance from the vertical pivot axis to the second geometrical rear wheel axis, comprising:

determining an operation parameter value indicative of the traction between a driven wheel of the rear section and the ground, and based on the determined parameter value selecting between a first control mode and a second control mode, and in the first control mode steering the wheels of the second geometrical rear wheel axis to substantially follow the same tracks as the wheels of the geometrical front wheel axis when driving the working machine during cornering, and in the second control mode steering the wheels of the second geometrical rear wheel axis to follow tracks which are different from the tracks of the wheels of the geometrical front wheel axis when driving the working machine during cornering, wherein the second control mode is selected when the operation parameter value is indicative of the traction for one or more wheels of the rear section and the ground is not sufficient when the front and rear wheels are following the same tracks.

2. A method according to claim 1, comprising having the wheels of the second geometrical rear wheel axis mounted to a pivotable supporting unit being suspended from the frame of the rear section and steering the wheels of the second geometrical rear wheel axis by pivoting the supporting unit.

3. A method according to claim 1, comprising steering the wheels of the second geometrical rear wheel axis by pivoting the wheels being individually suspended from the frame of the rear section.

4. A method according to claim 3, comprising steering the wheels of the second geometrical rear wheel axis by pivoting the wheels of the second geometrical rear wheel axis individually.

5. A method according to claim 1, comprising, in the first control mode, steering the wheels of the first geometrical rear wheel axis to substantially follow the same tracks as the wheels of the geometrical front wheel axis when driving the working machine during cornering, and, in the second control mode, steering the wheels of the first geometrical rear wheel axis to substantially follow the same tracks as the wheels of the second geometrical rear wheel axis when driving the working machine during cornering.

6. A method according to claim 5, comprising having the wheels of the first geometrical rear wheel axis mounted to a pivotable supporting unit being suspended from the frame of the rear section and steering the wheels of the first geometrical rear wheel axis by pivoting the supporting unit.

7. A method according to claim 5, comprising steering the wheels of the first geometrical rear wheel axis by pivoting the wheels being individually suspended from the frame of the rear section.

8. A method according to claim 7, comprising steering the wheels of the first geometrical rear wheel axis by pivoting the wheels of the first geometrical rear wheel axis individually.

9. A method according to claim 1, comprising automatically selecting and/or changing between the first and second control modes.

10. A method according to claim 1, comprising using the first control mode as a default mode.

11. A working machine comprising:

a front section having a frame and a pair of wheels arranged on a geometrical front wheel axis, and a rear section having a frame and a pair of wheels arranged on a first geometrical rear wheel axis and a pair of driven wheels arranged on a second geometrical rear wheel axis arranged behind the first geometrical rear wheel axis, the front section and the rear section being pivotally connected to each other for pivoting about a substantially vertical pivot axis, the distance from the geometrical front wheel axis to the vertical pivot axis being shorter than the distance from the vertical pivot axis to the second geometrical rear wheel axis, means for determining an operation parameter value indicative of the traction between a driven wheel of the rear section and the ground, and a mode selection function enabling selection between a first control mode and a second control mode based on the determined parameter value, wherein in the first control mode the wheels of the second geometrical rear wheel axis are steered to substantially follow the same tracks as the wheels of the geometrical front wheel axis when driving the working machine during cornering, and in the second control mode the wheels of the second geometrical rear wheel axis are steered to follow tracks which are different from the tracks of the wheels of the geometrical front wheel axis when driving the working machine during cornering, wherein the mode selection function is configured to select the second control mode when the operation parameter value is indicative of the traction for one or more wheels of the rear section and the ground is not sufficient when the front and rear wheels are following the same tracks.

12. A working machine according to claim 11, wherein the working machine has a pivotable supporting unit suspended from the frame of the rear section, and the wheels of the second geometrical rear wheel axis are mounted to the supporting unit whereby the wheels are pivotable by pivoting the supporting unit.

13. A working machine according to claim 11, wherein the wheels of the second geometrical rear wheel axis are individually suspended from the frame of the rear section.

14. A working machine according to claim 13, wherein the wheels of the second geometrical rear wheel axis are individually pivotable.

15. A working machine according to claim 11, wherein, in the first control mode, the wheels of the first geometrical rear wheel axis are steered to substantially follow the same tracks as the wheels of the geometrical front wheel axis when driving the working machine during cornering, and, in the second control mode, the wheels of the first geometrical rear wheel axis are steered to substantially follow the same tracks as the wheels of the second geometrical rear wheel axis during cornering.

16. A working machine according to claim 15, wherein the working machine has a pivotable supporting unit suspended from the frame of the rear section, and the wheels of the first geometrical rear wheel axis are mounted to the supporting unit whereby the wheels are pivotable by pivoting the supporting unit.

17. A working machine according to claim 15, wherein the wheels of the first geometrical rear wheel axis are individually suspended from the frame of the rear section.

18. A working machine according to claim 17, wherein the wheels of the first geometrical rear wheel axis are individually pivotable.

19. A working machine according to claim 11, wherein the wheels of the first geometrical rear wheel axis are non-steerable.

20. A working machine according to claim 11, wherein the distance from the geometrical front wheel axis to the vertical pivot axis is substantially the same as the distance from the vertical pivot axis to the first geometrical rear wheel axis.

21. A working machine according to claim 11, wherein the wheels of the geometrical front wheel axis are non-steerable.

22. A computer comprising computer code on a non-transitory, computer readable medium for performing a method for controlling a working machine, the working machine comprising a front section having a frame and a pair of wheels arranged on a geometrical front wheel axis, and a rear section having a frame and a pair of wheels arranged on a first geometrical rear wheel axis and a pair of wheels arranged on a second geometrical rear wheel axis arranged behind the first geometrical rear wheel axis, the front section and the rear section being pivotally connected to each other for pivoting about a substantially vertical pivot axis, the distance from the geometrical front wheel axis to the vertical pivot axis being shorter than the distance from the vertical pivot axis to the second geometrical rear wheel axis, comprising
  determining an operation parameter value indicative of the traction between a driven wheel of the rear section and the ground, and based on the determined parameter value selecting between a first control mode and a second control mode, and
  in the first control mode steering the wheels of the second geometrical rear wheel axis to substantially follow the same tracks as the wheels of the geometrical front wheel axis when driving the working machine during cornering, and
  in the second control mode steering the wheels of the second geometrical rear wheel axis to follow tracks which are different from the tracks of the wheels of the geometrical front wheel axis when driving the working machine during cornering, wherein the second control mode is selected when the operation parameter value is indicative of the traction for one or more wheels of the rear section and the ground is not sufficient when the front and rear wheels are following the same tracks.

23. A non-transitory computer readable medium comprising computer code for performing a method for controlling a working machine, the working machine comprising a front section having a frame and a pair of wheels arranged on a geometrical front wheel axis, and a rear section having a frame and a pair of wheels arranged on a first geometrical rear wheel axis and a pair of wheels arranged on a second geometrical rear wheel axis arranged behind the first geometrical rear wheel axis, the front section and the rear section being pivotally connected to each other for pivoting about a substantially vertical pivot axis, the distance from the geometrical front wheel axis to the vertical pivot axis being shorter than the distance from the vertical pivot axis to the second geometrical rear wheel axis, comprising
  determining an operation parameter value indicative of the traction between a driven wheel of the rear section and the ground, and based on the determined parameter value selecting between a first control mode and a second control mode, and
  in the first control mode steering the wheels of the second geometrical rear wheel axis to substantially follow the same tracks as the wheels of the geometrical front wheel axis when driving the working machine during cornering, and
  in the second control mode steering the wheels of the second geometrical rear wheel axis to follow tracks which are different from the tracks of the wheels of the geometrical front wheel axis when driving the working machine during cornering, wherein the second control mode is selected when the operation parameter value is indicative of the traction for one or more wheels of the rear section and the ground is not sufficient when the front and rear wheels are following the same tracks.

* * * * *